United States Patent
Haulk et al.

(10) Patent No.: US 6,626,359 B2
(45) Date of Patent: Sep. 30, 2003

(54) METHODS AND APPARATUS FOR REDUCED ELECTRONIC SHELF LABEL POWER CONSUMPTION

(75) Inventors: Kevin W. Haulk, Griffin, GA (US); Cheryl K. Harkins, Lawrenceville, GA (US)

(73) Assignee: NCR Corporation, Dayton, OH (US)

( * ) Notice: Subject to any disclaimer, the term of this patent is extended or adjusted under 35 U.S.C. 154(b) by 0 days.

(21) Appl. No.: 10/044,020

(22) Filed: Jan. 11, 2002

(65) Prior Publication Data
US 2003/0132290 A1 Jul. 17, 2003

(51) Int. Cl.[7] ............................................. G06K 15/00
(52) U.S. Cl. ........................ 235/383; 235/385; 705/20; 705/28
(58) Field of Search ................................ 235/383, 385; 705/20, 28; 340/5.91

(56) References Cited

U.S. PATENT DOCUMENTS

| | | | | |
|---|---|---|---|---|
| 4,500,880 A | * | 2/1985 | Gomersall et al. | 340/5.91 |
| 4,872,149 A | * | 10/1989 | Speas | 368/90 |
| 4,888,709 A | * | 12/1989 | Revesz et al. | 358/1.15 |
| 5,448,226 A | * | 9/1995 | Failing et al. | 340/5.91 |
| 5,510,602 A | * | 4/1996 | Evans et al. | 235/385 |
| 5,548,764 A | * | 8/1996 | Duley et al. | 713/310 |
| 5,704,049 A | * | 12/1997 | Briechle | 345/744 |
| 5,995,015 A | * | 11/1999 | DeTemple et al. | 340/825.49 |
| 6,130,603 A | * | 10/2000 | Briechle | 340/10.34 |

FOREIGN PATENT DOCUMENTS

JP 411219148 A * 8/1999 ............ G09G/3/20

* cited by examiner

Primary Examiner—Thien M. Le
Assistant Examiner—Steven S. Paik
(74) Attorney, Agent, or Firm—Priest & Goldstein, PLLC; Paul W. Martin

(57) ABSTRACT

An electronic shelf label (ESL) system with having a reduced power consumption ESL is described. In one aspect, the ESL system extends battery life and increases the time between battery replacements by turning off the display segments of an ESL's display at predetermined times, such as, for example, when the store is not open or when the tags are not being viewed by customers. If a blank display is undesirable, due to possible confusion with a malfunctioning ESL or battery outage, then a single segment or a limited number of segments may be turned on. In one aspect, one of an ESL's registers which contains the display contents maybe loaded with a "blank" indication, or spaces, which results in the ESL not displaying any text and all of the display segments being turned off. In a preferred embodiment the register containing the "blank" indication is a reserved register and is located at the same register address for all ESLs in a retail establishment, allowing a single broadcast message to be transmitted to all ESLs to turn the displays off. By using such a broadcast message, an entire retail establishment may have its ESLs turned off quickly, rather than having to address each of the ESLs individually. Prior to the store reopening, a second broadcast message may be transmitted to cause the ESLs to resume normal displays.

16 Claims, 5 Drawing Sheets

FIG. 3

| REG. NO. | REGISTER DATA | SEQUENCE REG. 1 | SEQUENCE REG. 2 | SEQUENCE REG. 3 | SEQUENCE REG. 4 | GROUP MASK |
|---|---|---|---|---|---|---|
| 1 | 2.50  .67 | 10 | 0 | 0 | 0 | 1 |
| 2 | 1.99  .50 | 0 | 10 | 0 | 0 | 1 |
| 3 |  | 0 | 0 | 0 | 0 | 1 |
| 4 |  | 0 | 0 | 0 | 0 | 1 |
| 5 | YOU SAVE | 0 | 5 | 0 | 0 | 1 |
| 6 | 0.51 | 0 | 5 | 0 | 0 | 1 |
| 7 | WITH CARD | 0 | 5 | 0 | 0 | 1 |
| 8 | BUY TODAY | 3 | 0 | 0 | 0 | 1 |
| 9 |  | 0 | 0 | 0 | 0 | 1 |
| 10 |  | 0 | 0 | 0 | 0 | 0 |
| 11 |  | 0 | 0 | 0 | 0 | 1 |
| 12 |  | 0 | 0 | 0 | 0 | 1 |
| 13 |  | 0 | 0 | 0 | 0 | 0 |
| 14 | STOCK 153 | 0 | 0 | 255 | 6 | 1 |
| 15 | BIB TODAY | 0 | 0 | 0 | 6 | 1 |
| 16 | UPDATING | 0 | 0 | 0 | 0 | 1 |

| CURRENT ACTIVE SEQUENCE | CURRENT BUTTON SEQUENCE |
|---|---|
| 1 | 4 |

| BUTTON ENABLED |
|---|
| 1 |

| GROUP REGISTER | ID |
|---|---|
| 1 | 15 |
| 2 | 25 |
| 3 | 101 |
| 4 | 500 |

| SCHEDULED SEQUENCE NUMBER | SCHEDULED SEQUENCE ENABLED | SCHEDULED SEQUENCE TIME | SCHEDULED SEQUENCE | SCHEDULED SEQUENCE DISPLAY |
|---|---|---|---|---|
| 1 | 1 | 2001-08-31  15:00:00 | 2 | 1 |
| 2 | 0 | - - | - - | - - |
| 3 | 1 | 2001-08-30  23:00:00 | 4 | 0 |
| 4 | 0 | - - | - - | - - |

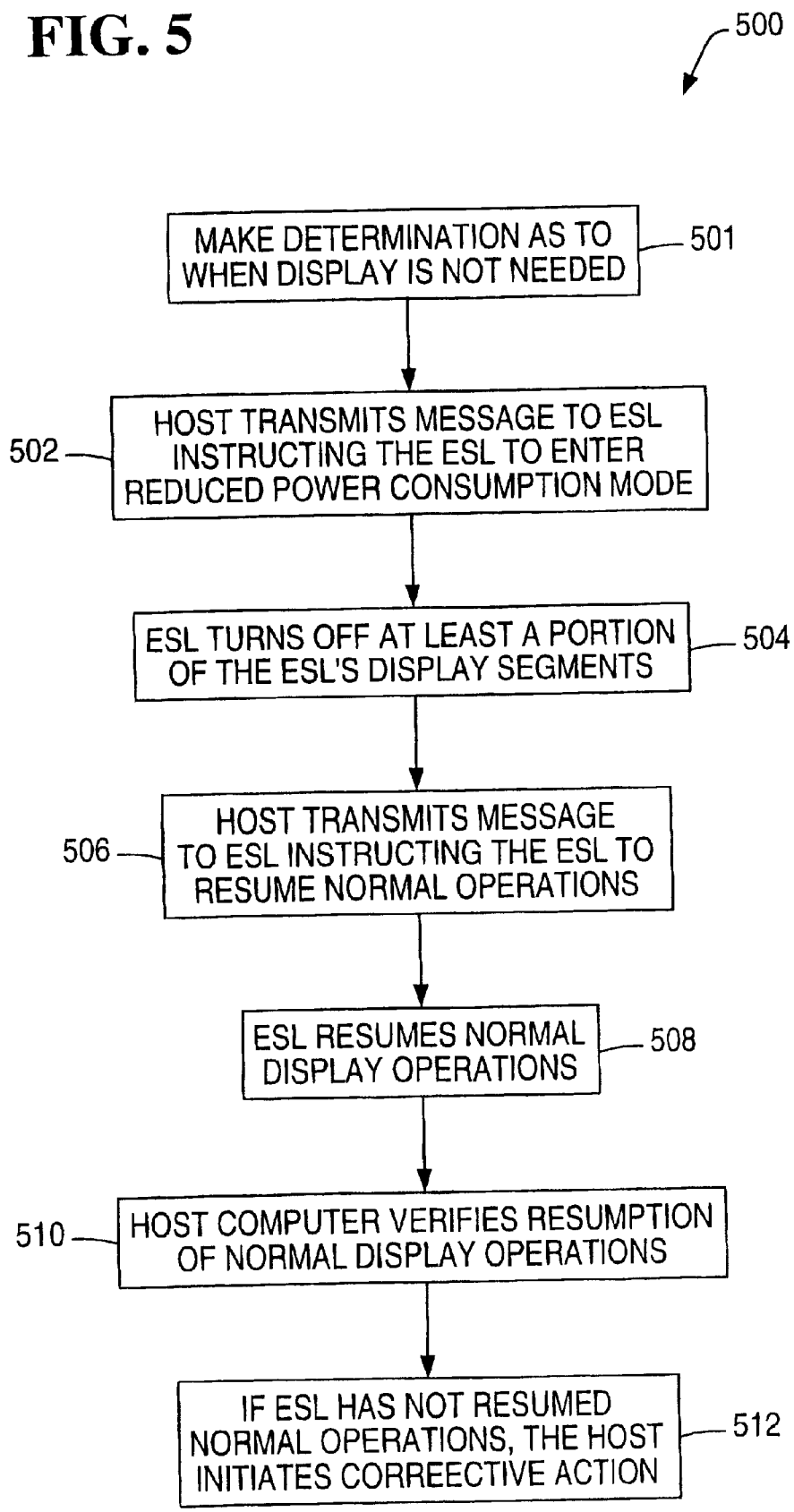

METHODS AND APPARATUS FOR REDUCED ELECTRONIC SHELF LABEL POWER CONSUMPTION

FIELD OF THE INVENTION

The present invention relates generally to improvements in electronic shelf label (ESL) systems used in transaction establishments. More specifically, the present invention relates to improvements in ESL systems including systems and methods for reducing ESL power consumption and extending ESL battery life.

BACKGROUND OF THE INVENTION

ESL systems typically include a plurality of ESLs for each merchandise item in a store. ESLs display the price of corresponding merchandise items on store shelves and are typically attached to a rail along the leading edge of the shelves. A store may contain thousands of ESLs to display the prices of the merchandise items. The ESLs are coupled to a central server where information about the ESLs is typically maintained in an ESL data file which contains ESL identification information and ESL merchandise item information. The central server sends messages, including price change messages, to the ESLs.

An ESL includes a variety of components, such as, for example, a liquid crystal display (LCD), a transmitter, a receiver, ESL circuitry and memory, all of which may be powered by a battery. Replacing the battery in an ESL is a manual process which may involve a store employee going to the location of the ESL, removing the discharged battery and inserting a new battery into the ESL. Increasing the time between battery replacements would result in a lower cost of ownership for the ESL system owner by reducing both the number of replacement batteries which must be purchased and the amount of time store employees spend replacing the batteries. As ESLs are found in increasing numbers at retail establishments, the cost savings from the reduction of battery replacements can be significant.

Battery consumption by the display portion of the ESL is proportional to the number of display segments turned on. Thus, an ESL with segments turned on consumes more power than an ESL with no segments turned on. For example, the amount of power needed to operate a typical LCD with 50% of the segments turned on may be approximately one-third of the total power consumption of the ESL.

Therefore, it would be desirable to provide an ESL system and method that conserves battery power by removing power from at least a portion of the display when the ESLs are not being viewed or utilized.

SUMMARY OF THE INVENTION

The present invention advantageously provides methods and apparatus for an improved electronic shelf label (ESL) system. An ESL system in accordance with the present invention extends battery life and increases the time between battery replacements by turning off the display segments of an ESL's display at predetermined times, such as, for example, when the store is not open or when the tags are not being viewed by customers. The extension of battery life results in a lower cost of ownership for the ESL system owner by reducing both the number of replacement batteries which must be purchased and the amount of time store employees spend replacing the batteries. If a blank display is undesirable, due to possible confusion with a malfunctioning ESL or battery outage, then a single segment or a limited number of segments may be turned on. In one aspect, one of an ESL's registers which contains the display contents may be loaded with a "blank" indication, or spaces (the lack of visible characters), which results in the ESL not displaying any text and all of the display segments being turned off.

In a preferred embodiment, the register containing the "blank" indication is a reserved register and is located at the same register address for all ESLs in a retail establishment, allowing a single broadcast message to be transmitted to all ESLs to turn the displays off. By using such a broadcast message, an entire retail establishment may have its ESLs turned off quickly, rather than having to address each of the ESLs individually. Prior to the store reopening, a second broadcast message may be transmitted to cause the ESLs to resume normal displays.

A more complete understanding of the present invention, as well as further features and advantages of the invention, will be apparent from the following detailed description and the accompanying drawings.

BRIEF DESCRIPTION OF THE DRAWINGS

FIG. 3 shows an exemplary ESL register map in accordance with the present invention;

FIG. 5 shows a method of reducing power consumption by an ESL in accordance with the present invention.

DETAILED DESCRIPTION

The present invention now will be described more fully with reference to the accompanying drawings, in which several presently preferred embodiments of the invention are shown. This invention may, however, be embodied in various forms and should not be construed as limited to the embodiments set forth herein. Rather, these embodiments are provided so that this disclosure will be thorough and complete, and will fully convey the scope of the invention to those skilled in the art.

Further details of an ESL system suitable for use in conjunction with the present invention are found in U.S. patent application Ser. No. 10/044,021 filed Jan. 11, 2002 entitled "Methods and Apparatus for Performing Delta Updates of an Electronic Shelf Label", U.S. patent application Ser. No. 10/044,610 filed Jan. 11, 2002 entitled "Methods and Apparatus for Intelligent Data Be check of an Electronic Shelf Label", U.S. patent application Ser. No. 10/044,535 filed Jan. 11, 2002 entitled "Methods and Apparatus for Error Detection and Correction of an Electronic Shelf Label System Communication Error", U.S. patent application Ser. No. 10/044,439 filed Jan. 11, 2002 entitled "Methods and Apparatus for Automatically Locating an Electronic Shelf Label", U.S. patent application Ser. No. 10/044,440 filed Jan. 11, 2002 entitled "Methods and Apparatus for Conserving Battery Power in an Electronic Shelf Label System", U.S. patent application Ser. No. 10/044,688 filed Jan. 11, 2002 entitled "Method and Apparatus for Automatic Assignment of a Communication Base Station and Timeslot for an Electronic Shelf Label", U.S. patent application Ser. No. 10/044,687 filed Jan. 11, 2002 entitled "Methods and Apparatus for Error Detection and Correction in Electronic Shelf Label System", all of which are assigned to the assignee of the present invention and incorporated by reference herein in their entirety.

Figure 1A:
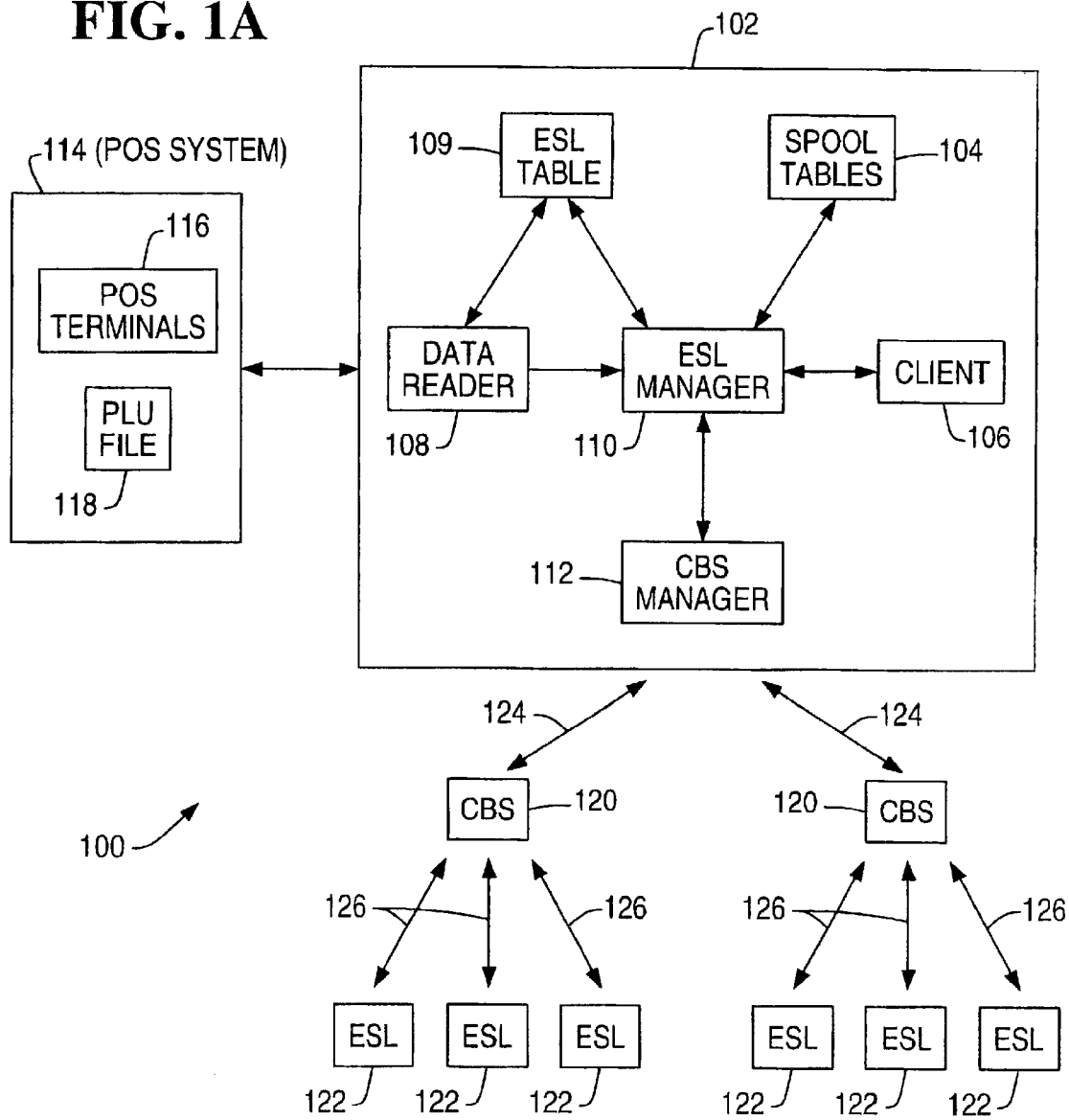
FIG. 1A shows a block diagram of a transaction management system in accordance with the present invention.

FIG. 1A shows a transaction management system 100 in accordance with the present invention. The system 100 includes an ESL computer system 102 and a point-of-sale (POS) system 114. Here, components 102 and 114 are shown as separate components that are networked together, but they and their subcomponents may also be combined or divided in various ways.

The host computer system 102 includes an ESL table 109, spool tables 104, data reader 108, ESL manager 110, a client 106 and a communication base station (CBS) manager 112. POS system 114 includes a price look up (PLU) file 118 and POS terminals 116.

The system 100 also includes CBSs 120 and ESLs 122. The CBSs 120 may be suitably mounted in or near the ceiling of the retail establishment. ESLs 122 are typically attached to store shelving adjacent to items.

The ESL manager 110 records and schedules messages to the ESLs 122. The ESL manager 110 monitors and maintains an action list for the ESLs 122 utilizing spool tables 104, and provides a scheduling functionality for time related events which need to occur at a future point at time. Items on the action list may be provided from client components as requests for work, may be automatically generated by the ESL manager 110, or could be due to requests that required additional processing at a later date, such as, for example, a series of sale prices to be represented at the tags at given times. Based on the events the ESL manager 110 has scheduled for an ESL 122, the ESL manager 110 creates the appropriate request and sends the request to the CBS manager 112. The requests may include register or memory updates of an ESL 122, diagnostic requests such as bedchecks, location requests such as finds, assignments to a particular timeslot, and the like. Based on the response returned from the ESL 122 via the CBS manager 120, the ESL manager 112 then updates the ESL table 109 and spool tables 104 as appropriate. Such updates may include marking a particular task as completed, updating the data image of the ESL 122, and the like. A client application, such as client application 106, may interface with the ESL manager 110. The data reader 108 provides an interface from the ESL manager 110 to the POS system 114.

The CBS manager 112 is responsible for all communications, processing, and monitoring of the CBSs. The CBS manager 112 receives information intended to be transmitted to the ESLs 122 and processes it into a form appropriate for use by the CBSs 120 and ESLs 122. The CBS manager 112 processes an ESL's 122 response after a CBS 120 has received a response from a particular ESL 122 and then passed that response to the CBS manager 112. Additionally, the CBS manager 112 monitors the CBSs 120 for problems, performs diagnostics on the CBSs 120 and logs errors.

The messages are sent to the CBSs 120 through communications link 124. Communications link 124 may suitably utilize radio frequency (RF) communication, infrared (IR) communication, a wired link, or some combination of communication techniques. After receiving a message from the host system 102, the CBSs 120 then transmit the message to the ESLs 122 utilizing communications link 126, which may suitably utilize RF communication, IR communication, a wired link or some combination of communication techniques. In an alternate embodiment, host system 102 may communicate directly with ESLs 122.

After receiving a message, the ESLs 122 transmit a response to CBSs 120 over communication link 126. The CBSs 120 would then process and retransmit the response message to the CBS manager 112 over communication link 124.

Figure 1B:
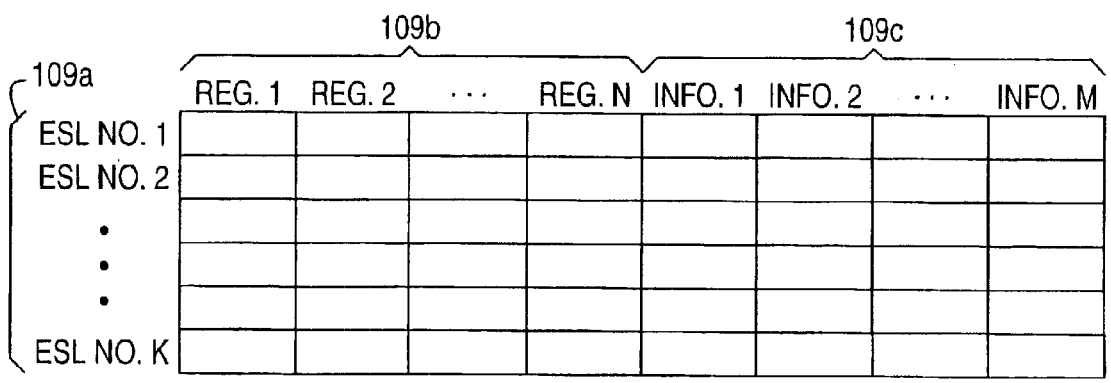
FIG. 1B shows a diagram of an ESL data file in accordance with the present invention.

As seen in FIG. 1B, the ESL data file 109 consists of multiple records 109a, with each record 109a corresponding to a particular ESL 122 in a retail establishment. The record 109a for each ESL 122 includes a number of fields 109b, with each field 109b containing the data which is assumed or supposed to be in one of the registers of the ESL 122. Thus, the record 109a contains a picture, or data image, of what data is supposed to be stored in the ESL 122, and consequently what the ESL 122 should be displaying on the ESL's display. Further details of an ESL's registers are provided below. Additionally, each record 109a may include a variety of additional information items Info. 1, . . . , Info. M 109c related to the ESL 122, such as the timeslot the ESL 122 listens on, the CBS 120 closest to the ESL 122, and the PLU number of the item associated with the ESL 122. The record 109a may also contains diagnostic and tally information items Info. 1, . . . , Info. M 109c related to that ESL 122, such as when the last time a message was sent to the ESL 122, the last time the ESL 122 had a data bedcheck, a count of how many times the ESL 122 has failed its data bedcheck, and the like.

Figure 2:
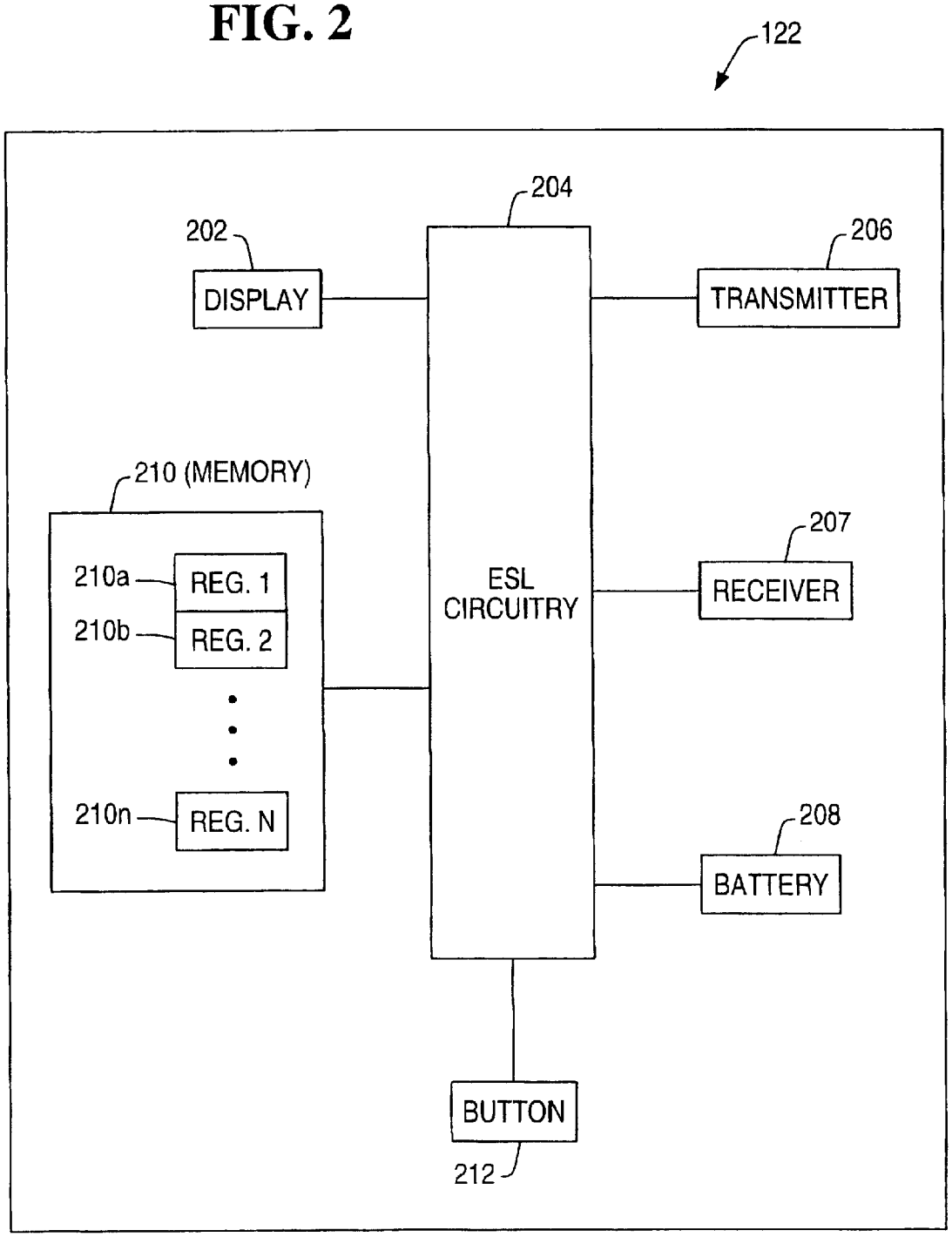
FIG. 2 is a block diagram of an ESL in accordance with the present invention.

FIG. 2 shows a block diagram of an exemplary ESL 122 in accordance with the present invention. A display 202 displays information, such as item price and related data. ESL 122 includes a transmitter 206 for transmitting messages and a receiver 207 for receiving messages. The transmitter 206 and receiver 207 may utilize RF communication, IR communication, a wired link or some combination of communication techniques. A battery 208 provides power for the operation of ESL 122. The operation of ESL 122 is controlled by ESL circuitry 204. ESL circuitry 204 decodes incoming messages received, and performs any actions indicated by the messages. For example, if a price change message is received, the ESL circuitry 204 would cause the display 202 to be updated with the new price information. ESL memory 210 includes a plurality of registers, such as registers 210a, 210b, . . . , 210n. The ESL memory 210 may contain many types of information. For example, the memory 210 may include display registers which contain the actual text to be displayed by the ESL 122. This text may include item price, informative or promotional text, text directed to store employees, and the like. Other registers may contain data which controls various parameters related to the display of the text, such as display register selection and timing sequences, for example. The ESL 122 may also include a button 212 which may be depressed to initiate a particular function, such as, for example, the display of an alternate message.

FIG. 3 shows an exemplary ESL register map 300 of the registers of an ESL 122 in accordance with the present invention. The ESL 122 may include sixteen display registers $302_1$, $302_2$, . . . , $302_{16}$ which contain the text or information to be displayed by the ESL 122. This display data may include a price or prices, some information text or promotional text, and possibly some text for in-store use, such as when to stock, what product to stock, and the like. The registers 302 may also store text that is not actually being displayed at any given time. How the text is displayed is controlled by other registers, as described in greater detail below.

The ESL 122 may also include four sequence registers 304, 306, 308, 310, with each sequence register storing sixteen numbers. The stored sixteen numbers in each sequence register correspond to the sixteen data registers. Each of the sixteen numbers may range from 0–255 and indicates how long the text in the corresponding register is to be displayed. A zero in one of the slots in the sequence register indicates that the corresponding text does not display. A 255 in the slot indicates that the text should display for 59.7 seconds, or approximately 1 minute. Numbers in between 0–255 indicate proportional times between 0 and 1 minute. Thus, as seen in the example shown in FIG. 3, the first sequence register 304 forces the contents of the first display register $302_1$ to display for 10 cycles, or about 2.3 seconds, and the contents of the eighth display register $302_8$ to display for 3 cycles, or about 0.7 seconds, with the contents of the remaining display registers 302 not being displayed. Thus, the ESL 122 displays "2.50 0.67" for about 2.3 seconds and then displays "BUY TODAY" for about 0.7 seconds. This cycle between the first display register $302_1$ and the eighth display register $302_8$ repeats, encouraging the customer to purchase the product, and informing the customer that the total cost of the item is $2.50 and that the unit price is $ 0.67.

At any particular time, a current active sequence register 312 indicates which one of the four sequence registers controls the text displayed by the ESL 122. In the example shown in FIG. 3, the current active sequence register 312 contains a "1", indicating that the first sequence register 304 will be utilized, and information will displayed as detailed above. If a message transmitted to the ESL 122 writes the current active sequence register 312 to "2", then the text displayed will be controlled by the second sequence register 306. The second sequence register 306 will then force the contents of the second display register $302_2$ to display for 10 cycles, or about 2.3 seconds, the contents of the fifth display register $302_5$ to display for 5 cycles, or about 1.17 seconds, the contents of the sixth display register $302_6$ to display for 5 cycles, and the contents of the seventh display register $302_7$ to display for 5 cycles, with the contents of the remaining display registers 302 not being displayed. Thus, the ESL 122 displays "1.99 0.50" for about 2.3 seconds, "YOU SAVE" for about 1.17 seconds, "0.51" for 1.17 seconds, and "WITH CARD" for 1.17 seconds, with the cycle repeating. Thus, a customer sees a sequence of "1.99 0.50", "YOU SAVE", "0.51 " and "WITH CARD", informing the customer that the total cost of the item is $2.50 and the unit price is $ 0.67, and encouraging the customer to save $ 0.51 by using a frequent shopper card to purchase the item.

One embodiment of an ESL 122 may include a button which, when depressed, temporarily changes the currently displayed sequence. The button may be disabled or enabled using the contents of button enabled register 316, with a "1" enabling the button and a "0" disabling the button. If the button is enabled, the current button sequence register 314 determines which sequence register is used to control the display while the button is depressed. In the example shown in FIG. 3, the current button sequence register 314 is loaded with a "4", indicating that the fourth sequence register 310 will control the display of information while the button is depressed.

The ESL 122 may include four group registers 318, 320, 322, 324. Each group register can contain an identification number which allows ESLs 122 to be addressed by the group the ESLs 122 belong to rather than individually. For example, group register 318 may be used to store a department number, such as the dairy department, allowing a single broadcast to affect all the ESLs in the dairy department.

The ESL 122 may also include four scheduled sequence registers 326, 328, 330, 332 which may be used to override the current active sequence. These registers may be loaded in advance and then will be automatically activated at the appropriate time. For example, the first scheduled sequence register 326 is enabled to switch the current active sequence on Aug. 31, 2001 at 3:00 PM (or 15:00:00) to the second sequence register 306 for the current display sequence. Thus, in scheduled sequence register 326, register element 326*a* is loaded with a "2", indicating the second sequence register 306 should be used for the new sequence, and register element 326*b* is loaded with a "1", indicating that the sequence affected is the current active sequence. As another example, the scheduled sequence register 330 is enabled to switch the current active sequence on Aug. 30, 2001 at 11:00 PM (or 23:00:00) to the fourth sequence register 310 for the button display sequence. Thus, in scheduled sequence register 330, register element 330*a* is loaded with a "4", indicating the fourth sequence register 310. Register element 330*b* is loaded with a "0", indicating that the sequence affected is the button sequence. The scheduled sequence registers 328 and 332 are both disabled in the example shown in FIG. 3.

The ESL 122 further includes a group mask register 334 comprising a series of sixteen bits corresponding to the sixteen registers 302 on the ESL 122. A "1" in the group mask for a particular register indicates that the register 302 should be displayed provided the associated sequence register contains a non-zero number. A "0" in the group mask for a particular register 302 indicates that the register 302 is not displayed even if the associated sequence register has a non-zero number in it. In other words, a "0" in the group mask overrides any setting in a sequence register which indicates that the contents of a register should be displayed.

Figure 4A:
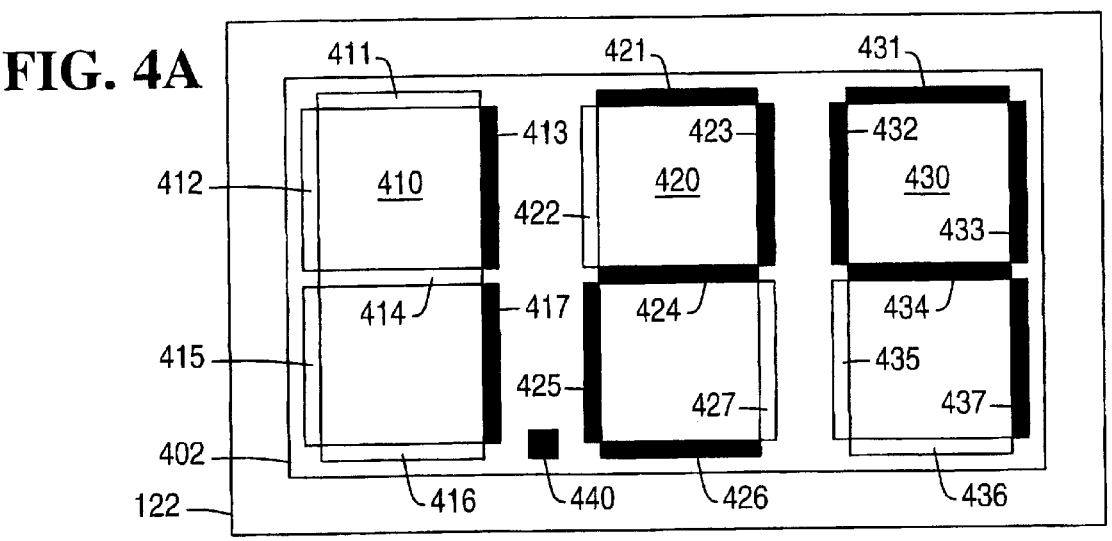
FIGS. 4A, 4B and 4C show frontal views of an ESL in accordance with the present invention.
Figure 4B:
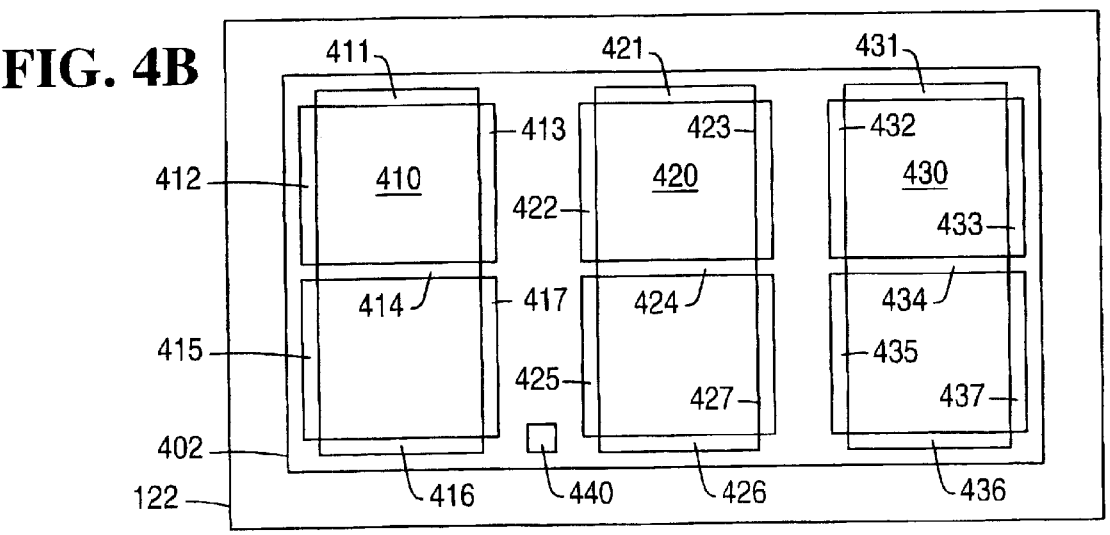
Figure 4C:
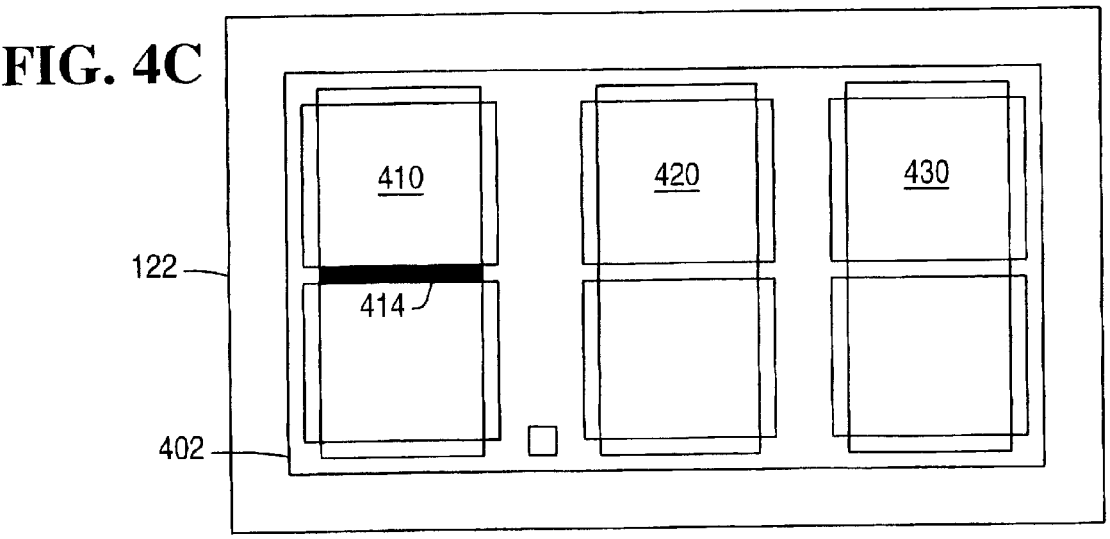

FIGS. 4A–4C show frontal views an ESL 122 in accordance with the present invention. A display 402 comprises three characters 410, 420 and 430, and a decimal point segment 440. While for simplicity only three characters are shown, an ESL may include a plurality of additional characters and segments to allow the display of text messages and the like. The character 410 comprises display segments 411, 412, 413, 414, 415, 416 and 417. The character 420 comprises display segments 421, 422, 423, 424, 425, 426 and 427. The character 430 comprises display segments 431, 432, 433, 434, 435, 436 and 437. Predetermined display segments are turned on to display prices or text messages. As seen in FIG. 4A, certain display segments are turned on to display the price of "1.29". As described above, battery consumption by the display 402 of an ESL 122 is proportional to the number of display segments turned on. An ESL 122 with multiple segments turned on consumes more power than an ESL 122 with no segments turned on. Replacing the battery 208 in an ESL 122 is typically a manual process which may involve a store employee going to the location of the ESL 122, removing the discharged battery 208 and inserting a new battery 208 into the ESL 122. An ESL system in accordance with the present invention extends battery life and increases the time between battery replacements by turning off the display segments at predetermined times, such as, for example, when the store is not open or when the tags are not being viewed by customers.

FIG. 4B shows an ESL 122 in accordance with the present invention in which all of the display segments are turned off when not needed to conserve battery usage. The ESL may suitably display spaces, or in other words, the lack of displayable characters, also referred to as a blank indication.

The resultant extension of battery life results in a lower cost of ownership for the ESL system owner by reducing both the number of replacement batteries which must be purchased and the amount of time store employees spend replacing the batteries. If a blank display is undesirable, due to possible confusion with a malfunctioning ESL or battery outage, then a single segment or a limited number of segments may be turned on. FIG. 4C shows an ESL 122 in accordance with the present invention in which only a single display segment 414 is turned on.

One or more messages may be transmitted to an ESL 122 by the ESL host computer 102 which causes the ESL 122 to turn off all of the display segments. One of the registers 302 which contains the display contents may be loaded with a blank indication, or space characters, which results in the ESL 122 not displaying any text and all segments being turned off. In one aspect, one of the sequence registers, such as sequence register 310, may then be set to display only the register 302 containing the spaces. The current active sequence register 312 may then be loaded with a value indicating that the sequence register 310 should be used to control the display sequence.

In another aspect of the present invention, all of the sequence registers may be set to display the register 320 containing the blank indication. When the ESL 122 is not operating in reduced power consumption mode, the group mask register 334 may be loaded with a value to force the register 320 containing the blank indication to not be displayed. When the ESL 122 is operating in reduced power consumption mode, the group mask register would be set to display only the register containing the blank indication. Thus, if all of the ESLs 122 in a retail establishment have a blank indication stored in the same display register and each of the sequence registers of the ESLs 122 are set to display the register containing the blank indication, a single broadcast message to the ESLs 122 loading the group mask register 334 with the appropriate value may be used to cause the ESLs 122 to display a blank indication, and then to resume normal operation.

In one embodiment, the register containing the blank indication is a reserved register and is located at the same register address for all ESLs 122 in a retail establishment, allowing a single broadcast message to be transmitted to all ESLs 122. By using such a broadcast message, an entire retail establishment may have its ESLs 122 turned off quickly, at store closing time, for example, rather than having to address each of the ESLs 122 individually. Prior to the store reopening, a second broadcast message may be transmitted to cause the ESLs to resume their normal display. The host computer 102 may suitably operate to automatically transmit these broadcast messages at the appropriate predetermined times. In an alternate embodiment, a single broadcast message may be used which indicates the beginning time and the ending time for blanking the display.

To ensure that a retail establishment's ESLs 122 have resumed normal display, a data bedcheck message may be transmitted to verify the contents of the registers. An ESL which fails such a bedcheck will have its registers rewritten or other corrective action will be taken. Further details of a bedcheck technique suitable for use in conjunction with the present invention can be found in U.S. application Ser. No. 10/044,687, entitled "Methods and Apparatus for Error Detection and Correction in an Electronic Shelf Label System" filed on Jan. 11, 2002.

In another aspect of the present invention, the scheduled sequence registers may be utilized to automatically change the display sequence to provide a blank display at a first predetermined time and then to resume normal operations at a second predetermined time.

In another aspect of the present invention, the group registers 318, 320, 322, 324 may also be used to blank the displays of ESLs 122 only in certain departments. For example, during certain time periods, the displays for beer or wine may be placed in a reduced power consumption mode if alcoholic beverages cannot be sold during those time periods.

In another aspect of the present invention, the button 212 may be used to override the blank display and force to ESL 122 to temporarily resume the normal display.

FIG. 5 shows a method 500 of reducing power consumption by an ESL in accordance with the present invention. In step 501, a determination is made as to when the display of text or promotional information by the ESL is not needed. In step 502, a computer system, such as host computer system 102, transmits at least one message to the ESL instructing the ESL to enter a reduced power consumption mode by turning off at least a portion of the ESL's display segments. The message may instruct the ESL to enter the reduced power consumption mode immediately or instruct the ESL to enter the reduced power consumption mode at a predetermined time. In an alternate embodiment, the message may include also include a predetermined time at which the ESL should resume normal display operations. In step 504, the ESL enters a reduced power consumption mode, turning off at least a portion of the ESL's display segments. In a preferred embodiment, all of the display segments are turned off. In step 506, the host computer system transmits at least one message to the ESL instructing the ESL to resume normal display operations. The message may instruct the ESL to enter the resume normal display operations immediately or instruct the ESL to resume normal display operations at a predetermined time. In step 508, the ESL resumes normal display operations, displaying the information which had been displayed before entering reduced power consumption mode. In step 510, the host computer system 102 verifies that the ESL has resumed normal operation. In a preferred embodiment, the host computer system performs a bedcheck or other operation to verify the contents of the ESL's registers. In step 512, if the ESL has not resumed normal operation, the host computer initiates corrective action, such as, for example, rewriting at least some of the ESL's registers or informing a system operator of the failure.

It will be apparent to those skilled in the art that various modifications and variations can be made in the present invention without departing from the spirit and scope of the present invention. Thus, it is intended that the present invention cover the modifications and variations of this invention provided they come within the scope of the appended claims and their equivalents. For example, while a presently preferred embodiment utilizes an ESL to display informational text or price of an associated item, an ESL system may utilize ESLs in a variety of applications and environments without departing from the spirit and scope of the present invention.

We claim:

1. A method of reducing power consumption by an electronic shelf label (ESL) comprising the steps of:

transmitting a message to the ESL instructing the ESL to load a first display contents register with space characters;

displaying price or informational text by the ESL, said price or informational text stored in a second display contents register;

determining when the display of price or informational text is not needed;

transmitting at least one message to the ESL instructing the ESL to display the space characters to reduce power consumption by the display without otherwise affecting operation of the ESL;

displaying the space characters in said first display contents register on the ESL's display to reduce the power consumption;

transmitting at least one message to the ESL instructing the ESL to resume displaying the price or informational text; and displaying the price or informational text by the ESL.

2. The method of claim 1 further comprising the steps of:

(g) determining if the ESL has resumed displaying the price or informational text; and (h) taking corrective action if the ESL has not resumed displaying the price of informational text.

3. The method of claim 1 wherein further comprises the step of:

transmitting a message to the ESL instructing the ESL to load a sequence register with the value enabling the display of space characters contained in the display contents register.

4. The method of claim 1 further comprising the step of:

transmitting a message to the ESL instructing the ESL to load a current active sequence register with a value which indicates a sequence register controlling the display of space characters.

5. The method of claim 1 wherein the at least one message transmitted to the ESL instructing the ESL to display the space characters instructs the ESL to display the space characters at a future predetermined time.

6. A method of reducing power consumption by a plurality of electronic shelf labels (ESLs) disposed throughout a retail establishment comprising the steps of:

transmitting a broadcast message to the ESLs instructing each of the ESL to load a display contents register with space characters;

displaying price or informational text by the plurality of ESLs;

determining when the display of price or informational text is not needed;

transmitting a broadcast message to the plurality of ESLs instructing the ESLs to display the space characters to reduce power consumption by the display without otherwise affecting operation of the ESL when the display of the price or informational text is not needed;

displaying said space characters on the ESLs' displays to reduce the power consumption;

transmitting a broadcast message to the ESLs instructing the ESLs to resume displaying the price or informational text; and displaying the price or informational text by the ESLs.

7. The method of claim 6 further comprising the steps of:

(g) determining if the ESLs have resumed displaying the price or informational text; and (h) taking corrective action if any of the ESLs have not resumed displaying the price or informational text.

8. The method of claim 6 further comprising the step of:

transmitting a broadcast message to the ESLs instructing each of the ESLs to load a sequence register with a value enabling the display of space characters contained in the display contents register.

9. The method of claim 6 further comprising the step of:

transmitting a broadcast message to the ESLs instructing each of the ESLs to load a current active sequence register with a value which indicates a sequence register controlling the display of space characters.

10. The method of claim 6 wherein the broadcast message to transmitted to the ESLs instructing the ESLs to display the space characters instructs the ESLs to display the space characters at a future predetermined time.

11. The method of claim 6 wherein the display contents register containing space characters is located at a same register address for each of the plurality of ESLS.

12. An electronic shelf label (ESL) system comprising:

an ESL including a display displaying price or informational text; and a host computer transmitting a first message to the ESL instructing the ESL to load a display contents register with space characters, said host computer transmitting a second message to the ESL instructing the ESL to display the space characters to reduce power consumption by the display without otherwise affecting operation of the ESL when the display of the price or informational text is not needed;

said ESL receiving the first message and reducing the power consumption of the display by displaying the space characters on the ESL's display; said host computer transmitting said second message to the ESL instructing the ESL to resume displaying the price or informational text; said ESL receiving the second message and displaying the price or promotional information.

13. The system of claim 12 wherein the host computer determines if the ESL has resumed displaying the price or informational text, and takes corrective action if the ESL has not resumed displaying the price or informational text.

14. The system of claim 12 wherein the host computer transmits a message to the ESL instructing the ESL to load a sequence register with a value enabling the display of space characters contained in the display contents register.

15. The system of claim 13 wherein the host computer transmits a message to the ESL instructing the ESL to load a current active sequence register with a value which indicates a sequence register controlling the display of space characters.

16. The system of claim 13 wherein the first message transmitted to the ESL instructs the ESL to display the space characters at a future predetermined time.

* * * * *